United States Patent
Chandra et al.

(10) Patent No.: US 6,216,132 B1
(45) Date of Patent: *Apr. 10, 2001

(54) METHOD AND SYSTEM FOR MATCHING CONSUMERS TO EVENTS

(75) Inventors: Tushar Deepak Chandra, Elmsford, NY (US); Robert Evan Strom, Ridgefield, CT (US); Daniel Charles Sturman, Croton-on-Hudson, NY (US); Mark Christopher Astley, Urbana, IL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,280

(22) Filed: Nov. 20, 1997

(51) Int. Cl.$^7$ .............................. G06F 17/00; G06F 15/16
(52) U.S. Cl. .............................. 707/103; 706/48; 709/229
(58) Field of Search ...................... 707/103, 10; 395/733, 395/670, 682, 872, 8, 9, 101, 104; 706/48; 709/229

(56) References Cited

U.S. PATENT DOCUMENTS

| | | | |
|---|---|---|---|
| 5,237,662 | * 8/1993 | Green et al. ........................... | 395/670 |
| 5,257,369 | 10/1993 | Skeen et al. .......................... | 395/650 |
| 5,321,813 | 6/1994 | McMillen et al. .................... | 395/200 |
| 5,398,012 | 3/1995 | Derby et al. ..................... | 340/825.03 |
| 5,465,335 | * 11/1995 | Anderson .............................. | 709/107 |
| 5,517,562 | 5/1996 | McConnell ........................... | 379/207 |
| 5,522,046 | 5/1996 | McMillen et al. ............... | 395/200.15 |
| 5,535,322 | 7/1996 | Hecht ................................... | 395/155 |
| 5,557,798 | 9/1996 | Skeen et al. .......................... | 395/650 |
| 5,566,337 | * 10/1996 | Szymanski et al. .................. | 395/733 |
| 5,581,764 | 12/1996 | Fitzgerald et al. .................... | 395/703 |
| 5,612,957 | 3/1997 | Gregerson et al. ................... | 370/401 |
| 5,870,605 | * 2/1999 | Bracho et al. ........................ | 395/682 |
| 5,873,084 | * 2/1999 | Bracho et al. ......................... | 707/10 |
| 5,881,315 | * 3/1999 | Cohen .................................. | 395/872 |
| 5,999,978 | * 12/1999 | Angal et al. .......................... | 709/229 |

OTHER PUBLICATIONS

Rosenblum et al, "A Design Frameworkfor Internet–Scale Event Observation and Notification", Proceedings of the 6th European conference, 1997, pp. 344–360.*

Dadoun et al, "Parallel Processing for Efficient Subdivision Search", ACM 1987, pp. 205–214.*

Cormen, Thomas H., Leiserson, Charles E. and Rivest, Ronald L., *Introduction to Algorithms*, Chapter 24, "Minimum Spanning Trees," pp. 498–513, McGraw–Hill Book Company (1990).

(List continued on next page.)

*Primary Examiner*—Thomas G. Black
*Assistant Examiner*—Uyen Le
(74) *Attorney, Agent, or Firm*—Heslin & Rothenberg, P.C.

(57) ABSTRACT

A generalized search data structure is used to match consumers to events in event computing systems. The search data structure includes one or more paths from a root of the structure to one or more leaves of the structure. Each path has at least one level and each level corresponds to a filter attribute. The value of at least one filter attribute in at least one path is a don't care value indicating traversal of that path is guaranteed to proceed. In addition to following the path with the don't care value, one or more additional paths may also be followed. Thus, traversal of the search data structure may yield zero or more results, indicating that zero or more consumers match the specified event. Various optimizations of the search data structure are possible.

72 Claims, 9 Drawing Sheets

OTHER PUBLICATIONS

Internet World Wide Web Site Section entitled "TIB/Rendezvous White Paper," located at Web Site http://www.rv.tibco.com/rvwhitepaper.html, printed pp. 1–16, (1994–1997).

Internet World Wide Web Site Section entitled "Intranet/Internet," located at Web Site http://www.tibco.com/products/internet.html, printed page 1 of 1, date printed from Internet Apr. 29, 1997, actual date of paper unknown.

Internet World Wide Web Site Section entitled "TIBnet Overview," located at Web Site http://www.tibco.com/announce/tibwhite.html, printed pp. 1–5, date printed from Internet Apr. 29, 1997, actual date of paper unknown.

Internet World Wide Web Site Section entitled "NEONet Product Overview," located at Web Site http://www.neonsoft.com/prods/neonover.html, printed pp. 1–18, date printed from Internet Oct. 20, 1997, actual date of paper unknown.

Skeen, Dale Ph.D. and Vitria Technology, Inc. "Velociti The Enterprise–Capable Publish–Subscribe Server," located at Internet World Wide Web Site http://www.vitria.com/whitepapers/velocitiwp.html, printed pp. 1–17, date printed from Internet Jan. 14, 1998, actual date of paper unknown.

Lorenzo Aguilar, "Datagram Routing for Internet Multicasting," ACM Computer Communications Review, 14(2), 1984, pp. 58–63.

D. Scott Alexander et al., "The SwitchWare Active Network Architecture," IEEE Network Special Issue on Active and Controllable Networks, May/Jun. 1998, vol. 12, No. 3, pp. 29–36.

Uyless Black, TCP/IP & Related Protocols, Second Edition. McGraw–Hill, 1995, pp. 122–126.

Antonio Carzaniga, "Architectures for an Event Notification Service Scalable to Wide–area Networks". Available from http://www.cs.colorado.edu/users/carzaniga/siena/index.html, No Date.

Stephen E. Deering, "Multicast Routing in InterNetworks and Extended LANs," ACM Computer Communications Review, 18(4), 1988, pp. 55–64.

John Gough and Glenn Smith, "Efficient Recognition of Events in a Distributed System," Proceedings of ACSC–18, Adelaide, Australia, 1995.

Bill Segall and David Arnold, "Elvin has left the building: A publish/subscribe notification service with quenching," Proceedings of AUUG97, Brisbane, Australia, Sep. 1997. Available from http://www.dstc.edu.au/Elvin/papers/AUUG97//AUUG97.html.

R. Sharma, S. Keshav, M. Wu and L. Wu, "Environments for Active Networks," Proceedings of the IEEE 7th International Workshop on Network and Operating System Support for Digital Audio and Visual, 1997, pp. 77–84.

Tony Speakman, Dino Farinacci, Steven Lin and Alex Tweedly, "PGM Reliable Transport Protocol," IETF Internet Draft, Aug. 24, 1998.

D. Tennenhouse, J. Smith, W. D. Sincoskie, D. Wetherall, G. Minden. "A Survey of Active Network Research," IEEE Communications Magazine. Jan., 1997, vol. 35, No. 1, pp. 80–86.

Hanson, et al., "A Predicate Matching Algorithm for Database Rule Systems", Published at Proceedings of SIGMOD, pp. 271–280 (1991).

Mishra et al., "Consul: A Communication Substrate for Fault–Tolerant Distributed Programs", TR91–32, Department of Computer Science, The University of Arizona, pp. 1–33 (Nov. 1991).

Birman, Kenneth P., "The Process Group Approach to Reliable Distributed Computing", Communications of the ACM, vol. 36, No. 12, pp. 37–53 (Dec. 1993).

Oki et al., "The Information Bus—An Architecture for Extensible Distributed Systems", SIGOPS '93, ACM 0–89791–632–8/93/0012, pp. 58–68 (1993).

Cahoon et al., "Performance Evaluation Of A Distributed Architecture For Information Retrieval", SIGIR Forum (USA), Zurich, Switzerland, pp. 110–118 (Aug. 1996).

Powell, David, "Group Communication", Communications of the ACM, vol. 39, No. 4, pp. 52–100 (Apr. 1996).

* cited by examiner

METHOD AND SYSTEM FOR MATCHING CONSUMERS TO EVENTS

TECHNICAL FIELD

This invention relates, in general, to event computing systems and, in particular, to evaluating which consumers of an event computing system are interested in a particular event.

BACKGROUND ART

A common practice for connecting autonomous components within a computing system has been to utilize events. Events are, for example, data generated by a provider and delivered through a communication medium, such as a computer network, hard disk, or random access memory, to a set of interested consumers. The providers and consumers need not know one another's identity, since delivery is provided through intermediary software. This independence between provider and consumer is known as decoupling.

One example of an event computing system is a database event system. Modern database systems include support for event triggers. Event triggers associate a filter, which is a predicate that selects a subset of events and excludes the rest, with an action to take in response to events on the database. An event on a database is any change to the state of the database.

In database event systems, gating tests have been used to determine which consumers of a system are interested in a particular event. That is, gating tests have been used to match filters in event triggers to events. As described in "A Predicate Matching Algorithm for Database Rule Systems," by Hanson et al., Proceedings of SIGMOD (1991), pp. 271–280, gating tests identify a single predicate for each filter as primary, and tests are organized in a data structure based on this primary predicate. Additionally, the data needs to be organized based on the primary predicate.

Another example of an event computing system is a distributed event system, also known as a publish/subscribe system. A publish/subscribe system is a mechanism where subscribers express interest in future information by some selection criterion, publishers provide information, and the mechanism delivers the information to all interested subscribers. Current publish/subscribe systems organize information around groups (also called channels, subjects or streams). Providers or publishers publish events to groups and consumers or subscribers subscribe to all data from a particular group. Thus, in order to use a group based publish/subscribe system, data must be pre-partitioned into groups. Although new groups may be added to the system as it evolves, there is no mechanism to reconfigure the existing groups in a system. Additionally, groups tend to partition information along a single dimension. There is no elegant mechanism to support applications that view data along another dimension.

One example of a publish/subscribe system is described in detail in U.S. Pat. No. 5,557,798, issued to Skeen et al. on Sep. 17, 1996, and entitled "Apparatus And Method For Providing Decoupling Of Data Exchange Details For Providing High Performance Communication Between Software Processes", which is hereby incorporated herein by reference in its entirety. In U.S. Pat. No. 5,557,798, the publisher of an event annotes each message with a group identifier called a subject and a subscriber subscribes to a particular subject. Thus, if a subscriber is interested in just a portion of the events having a given subject, it would have to receive the entire subject and then discard the unwanted information.

Based on the foregoing, a need exists for a matching capability that does not require the partitioning of data into subjects. A further need exists for a matching capability that enables a consumer to use any filtering criterion expressible with the available predicates. Additionally, a need exists for a mechanism that allows a consumer to receive only the information that it desires, such that the filtering is done independent of the consumer.

SUMMARY OF THE INVENTION

The shortcomings of the prior art are overcome and additional advantages are provided through the provision of a method of determining zero or more consumers interested in an event. The method includes, for example, receiving an event and using a search data structure to determine zero or more consumers interested in the event. The search data structure includes a path having one or more levels and the one or more levels correspond to one or more attributes. A value of at least one attribute is a don't care value, indicating traversal of the path is guaranteed to proceed.

In one embodiment, use of the search data structure includes traversing the search data structure from a root of the search data structure to zero or more leaves of the data structure. The zero or more leaves indicates zero or more consumers interested in the event.

In another embodiment, the method includes building the search data structure. In one example the building includes specifying, by a consumer, a filter having one or more attribute values. The one or more attribute values corresponds to one or more attributes. The one or more attribute values are inserted into the search data structure.

In a further embodiment of the invention, the building includes transforming the search data structure. In one example, the transforming includes combining levels within the path corresponding to a plurality of consecutive attributes in the path having the don't care values.

In another embodiment, the search data structure includes a plurality of paths and the method further includes computing a successor set for a node of the search data structure. The successor set defines how to traverse the search data structure after reaching the node.

In yet another embodiment of the invention, the search data structure includes a plurality of sub-search data structures.

In another aspect of the present invention, a method of publishing an event in a publish/subscribe system is provided. The method includes, for example, providing, by a publisher of the publish/subscribe system, an event to be published to one or more subscribers of the publish/subscribe system. The event is independent of a group association and lacks a group identifier. The event is published to the one or more subscribers indicating interest in the event.

In a further aspect of the invention, a method of publishing an event in a publish/subscribe system is provided. The method includes, for instance, indicating interest in an event, by a first subscriber, using one attribute; indicating interest in the event, by a second subscriber, using another attribute; and publishing the event to the first and second subscribers.

In another aspect of the present invention, at least one program storage device readable by a machine, tangibly embodying at least one program of instructions executable by the machine to perform a method of determining zero or more consumers interested in an event is provided. The method includes, for instance, receiving an event and using a search data structure to determine zero or more consumers interested in the event. The search data structure includes a path having one or more levels, in which the one or more levels corresponds to one or more attributes. A value of at least one attribute is a don't care value indicating traversal of the path is guaranteed to proceed.

In another aspect of the present invention, at least one program storage device readable by a machine, tangibly embodying at least one program of instructions executable by the machine to perform a method of publishing an event in a publish/subscribe system is provided. The method includes, for instance, providing by a publisher of the publish/subscribe system an event to be published to one or more subscribers of the publish/subscribe system. The event is independent of a group association and lacks a group identifier. The event is published to the one or more subscribers indicating interest in the event.

In yet another aspect of the present invention, at least one program storage device readable by a machine, tangibly embodying at least one program of instructions executable by the machine to perform a method of publishing an event in a publish/subscribe system is provided. The method includes, for instance, indicating interest in an event, by a first subscriber, using one attribute; indicating interest in the event by a second subscriber, using another attribute; and publishing the event to the first and second subscribers.

The present invention advantageously provides a capability for matching filters to events based on a general search data structure. Because of the generality of the data structure, a number of optimizations are applicable and, consequently, the invention yields better performance than other matching techniques, in many cases.

In addition to the above, the present invention enables the construction of a publish/subscribe system based on content-based subscription. Content-based subscription allows consumers to specify a filter in its subscription rather than a group identifier. The filter enables the specification of one or more attributes for defining the search. Thus, the information sent to the subscriber is only that information requested by the subscriber.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a matching capability is provided, which facilitates the matching of consumers to events. The matching facility includes a search data structure (e.g., a search tree or a search graph), which is used to determine the consumers interested in a particular event. The search data structure is a general structure that is conducive to various optimizations.

Figure 1:
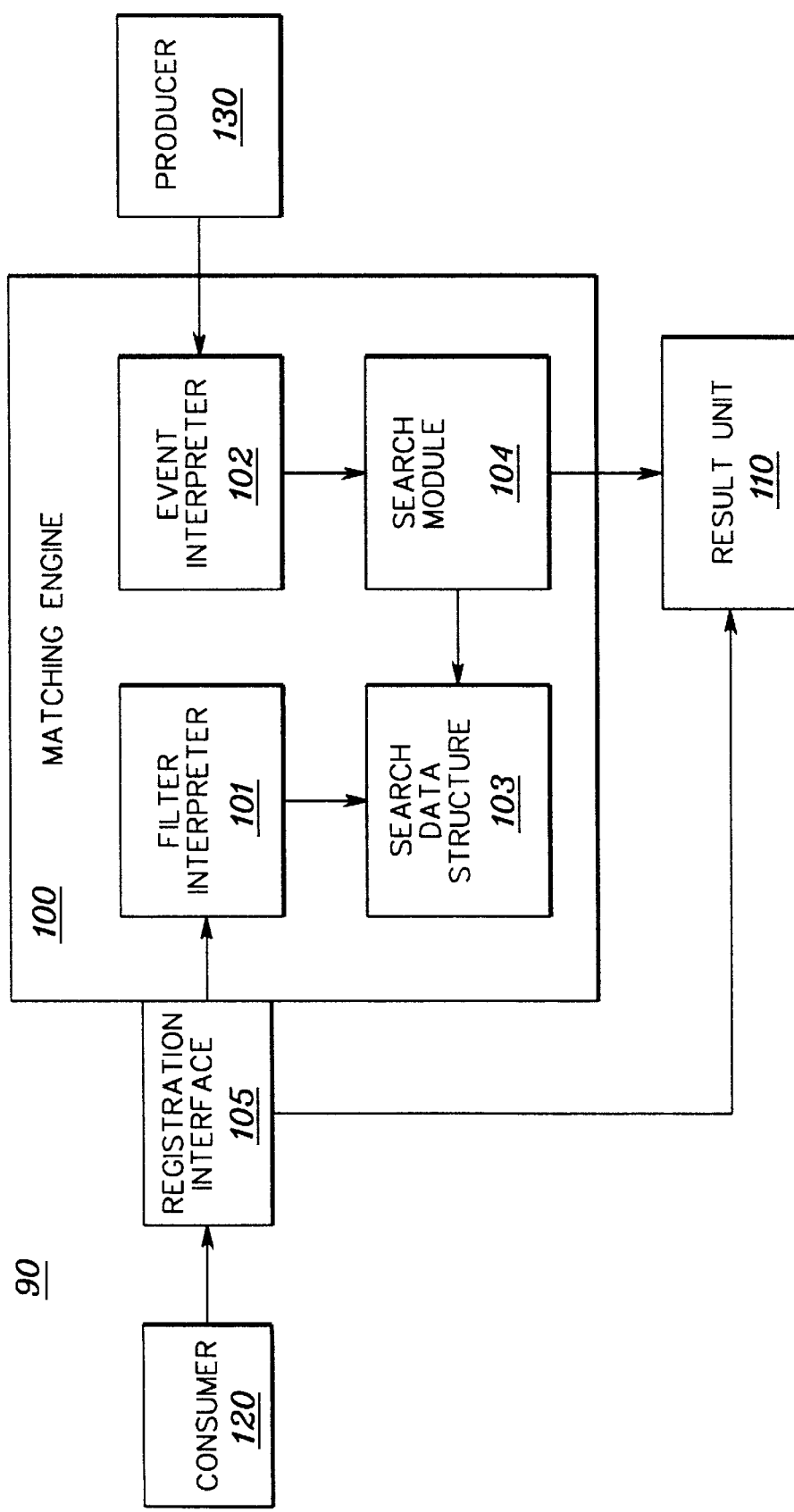
FIG. 1 depicts one example of a computing system incorporating and using the matching capability of the present invention.

The search data structure of the present invention can be used in various computing systems. One example of a computing system incorporating and using the search data structure of the present invention is depicted in FIG. 1 and described in detail herein.

In one example, a computing system 90 includes various components, such as a matching engine 100, a registration interface 105, a result unit 110, at least one consumer 120 and at least one producer 130. All of the components may be included within a single computing unit, such as, for instance, an RS/6000 computing node, or the components may be distributed among a number of computing units. The distributed units may also include RS/6000 computing nodes, as just one example. It will be apparent to those skilled in the art that various other types of computing units, computing nodes, processors, computers, or systems may be used without departing from the spirit of the present invention.

Consumer 120, which is, for instance, anyone or anything that is interested in data (e.g., an event), registers with registration interface 105 a filter and an action to take in response to an event. The filter is defined by a pattern, which describes those events of interest for a given consumer (e.g., a trigger in a database event system or a subscriber in a publish/subscribe system). In particular, the pattern includes one or more filter attributes (e.g., tests) that are used in matching the consumer to an event. Patterns define relations for each attribute, and therefore describe a (potentially infinite) set of events. The filter and its associated action is referred to herein as a pair.

Registration interface 105 assigns a unique identifier to the pair. In one example, the unique identifier is a numeric identifier provided by a counter of the registration interface. The registration interface delivers the filter, labeled with the identifier, to a filter interpreter 101 within matching engine 100. In one example, the delivery is made by passing parameters from registration interface 105 to filter interpreter 101. The registration interface also delivers the action, labeled with the identifier, to result unit 110. The delivery mechanism is similar to that described above. If the invention is being used to match triggers in a database, the action is the action when the filter matches an event; for a publish/subscribe system, the action is to deliver the matching event to the consumer.

Filter interpreter 101 transforms the filter, received from registration interface 105, into a format that may be stored in a search data structure 103, such as a search tree or a search graph. For example, if a filter attribute includes a range, the filter interpreter converts the range into a form suitable for the data structure.

One example of how to convert ranges is described in detail in "A Predicate Matching Algorithm for Database Rule Systems," by Hanson et al., Proceedings of SIGMOD (1991), pp. 271–280, which is hereby incorporated herein by reference in its entirety. A range may be flattened, for instance, into equality tests. The flattening process may entail creating derived attributes, and therefore, a single attribute in the unflattened event may result in several attributes in the flattened event. In the examples described herein, equality tests over a flattened structure are assumed, where the i-th pattern is of the form:

$$<p_{i1}, p_{i2}, \ldots, p_{iK}>$$

Each $p_{ij}$ is either a primitive value, requiring an equality test of attribute j in each event against the value $p_{ij}$, or the value *, meaning that there is no test of attribute j. K is the length of all flattened events and patterns. This is, however, only one example.

The filter interpreter is responsible for constructing the search data structure in the manner described herein. A discussion of how to construct the search data structure will follow after a discussion of the data structure itself.

Figure 2A:
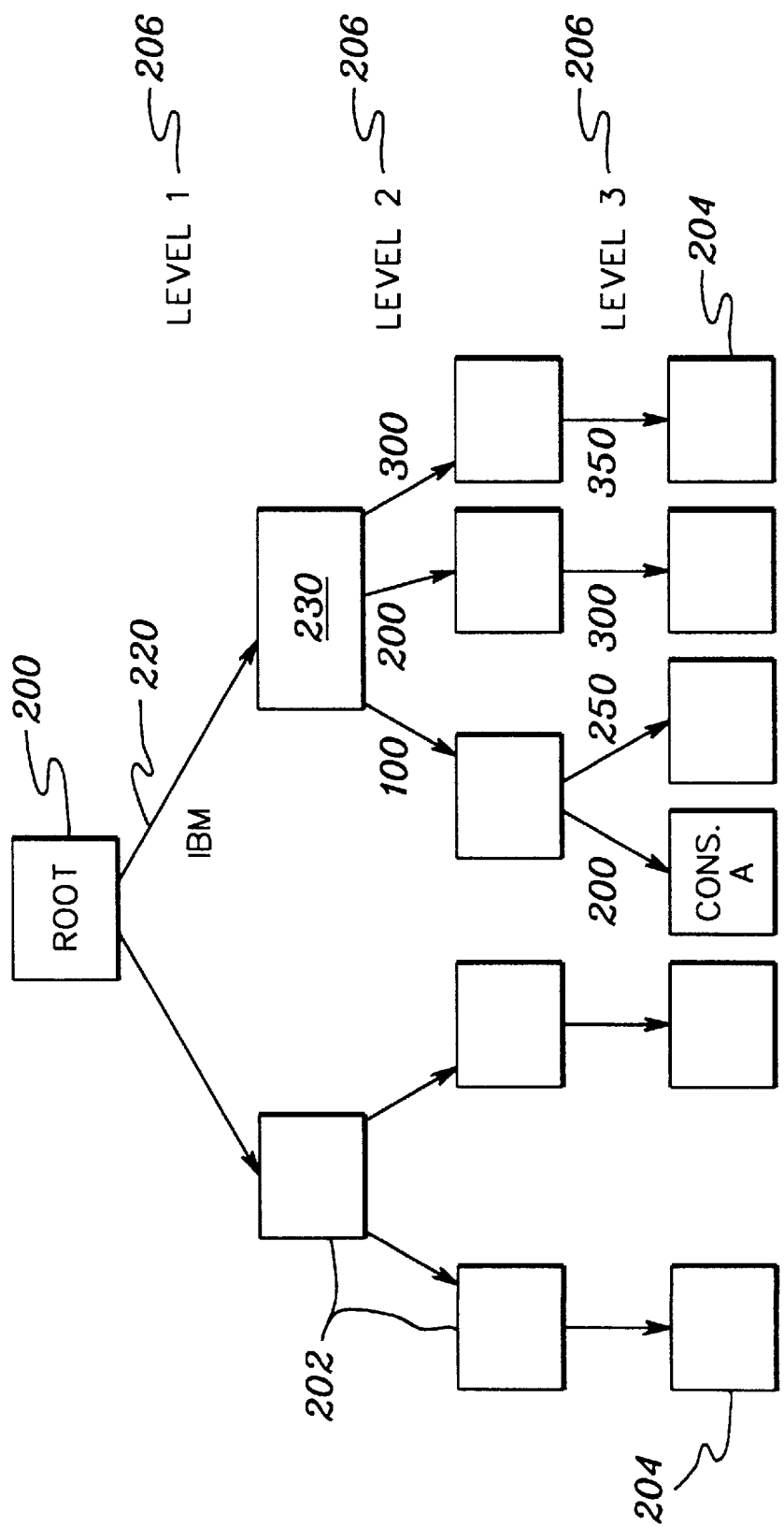
FIG. 2a depicts one example of a search data structure (e.g., a search tree) built and used in accordance with the principles of the present invention.

One embodiment of a search data structure is depicted in FIG. 2a and described herein. In one example, the search data structure is a search tree, and the embodiment described herein refers to such a search tree. However, this is only one example.

Referring to FIG. 2a, search tree 103 includes, for instance, a root node 200, one or more intermediary nodes 202, and one or more leaf nodes 204. The tree also includes one or more levels 206, and each level corresponds to one filter attribute. For example, assume a filter represents a stock market example and the filter has the following three attributes: stock issue, stock price, and stock volume. Then, the first attribute, stock issue, would be at level 1, the second attribute, stock price, at level 2, and the third attribute, stock volume, at level 3. This example of a stock market filter with three attributes is only one example. Filters can have any number of attributes and can represent any type of data or information.

Figure 2B:
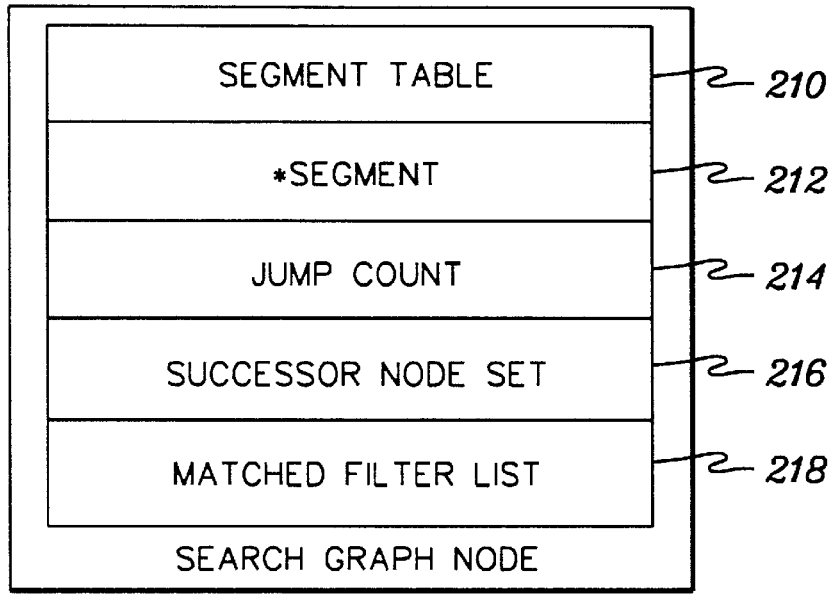
FIG. 2b depicts one example of information stored in a node of a search data structure (e.g., a search tree or graph) of the present invention.

In one embodiment, each node of the tree includes information pertaining to how the tree is to be traversed. One example of the information stored in a node is depicted in FIG. 2b. As shown, a node may include a segment table 210, a * segment 212, a jump count 214, a successor node set 216 and a matched filter list 218, each of which is described below.

Segment table 210 is, for instance, a hash table including non-* segments. Non-* segments are those path segments in a tree that have a concrete attribute value and child node identifier associated therewith. For example, assume a path segment 220 (FIG. 2a) extending from the root node to an intermediary node is labelled with a filter attribute value of "IBM", then that segment would be considered a non-* segment and the label of "IBM" and the identifier of the next node (e.g., node 230) would be stored in the segment table of the root node.

A * segment is a segment having a don't care value. The don't care value indicates a successful result for whatever test is performed at a node. It guarantees that traversal of a path will continue to at least one other node in the path. For instance, if a consumer did not care about a particular filter attribute (e.g., stock issue in the above example), then the segment corresponding to that attribute would be labeled with a *, as one example. This indicates that the consumer is interested in all stock issues (e.g., IBM, Microsoft, AT&T, etc.) and not just one particular stock issue.

Jump count 214 and successor node set 216 correspond to optional optimizations on the search data structure and are described in further detail below. Matched filter list 218 is typically empty, except in the leaf nodes. The matched filter list includes a list of the one or more consumers interested in the event specified by the path leading to the leaf. Specifically, the list in a particular leaf node indicates the one or more consumers that specified the filter represented by the path. For example, if Consumer A specified a stock filter having attributes of IBM, 100, 200, the leaf at the end of that path (see FIG. 2a) would include Consumer A.

Although in the embodiment described above, each node includes at least some information, in another embodiment, one node or a subset of the nodes, may be selected to hold any relevant information.

Returning to FIG. 1, as mentioned above, filter interpreter 101 is responsible for building the search data structure. One embodiment of the logic used to build a search data structure is described below with reference to FIG. 3.

Initially, filter interpreter 101 selects a first attribute of the filter, STEP 300. Then, it checks to see if a segment (edge or arc) extending from the root of the tree already exists for the value of that attribute, INQUIRY 302. In one embodiment, this determination is made by checking the information stored at that node. In particular, if a segment corresponding to the attribute value exists, then its label will either be in segment table 210 (FIG. 2b) or * segment 212.

Figure 3:
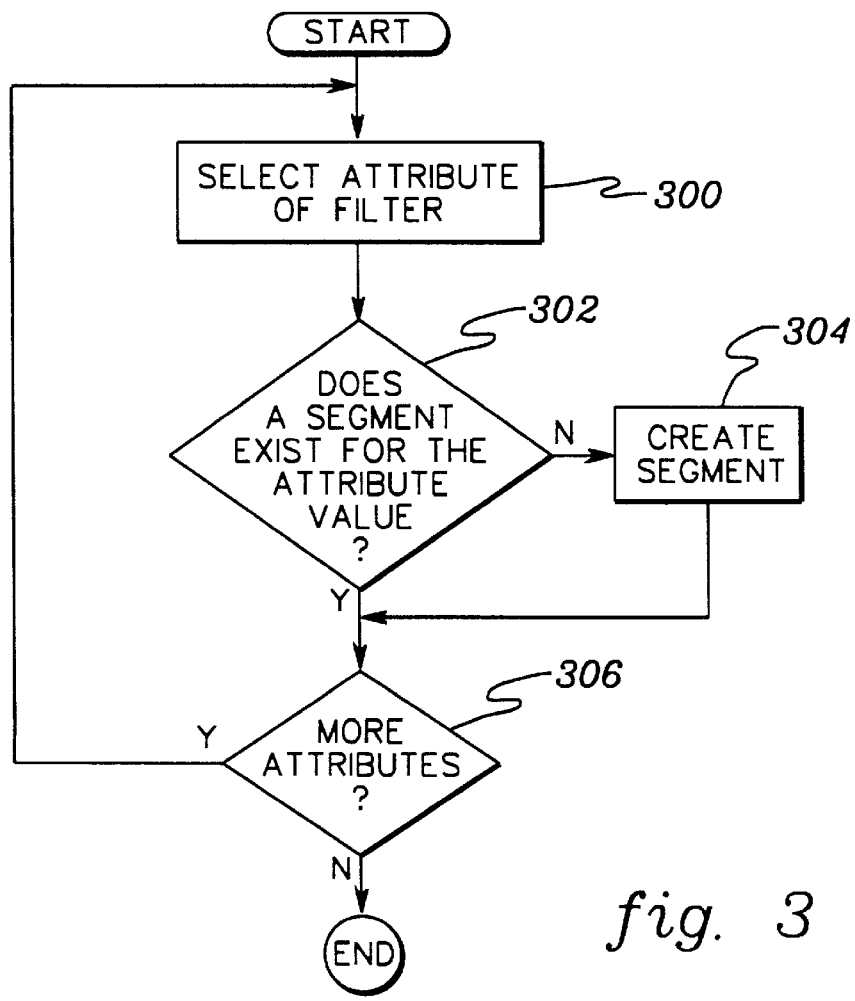
FIG. 3 depicts one embodiment of logic used to build a search data structure, in accordance with the principles of the present invention.

If there is a segment, filter interpreter 101 follows the segment to a child node. If not, it creates a new segment extending to a new child node, STEP 304 (FIG. 3). In one example, this includes adding the segment label to either segment table 210 or * segment 212, as appropriate.

Thereafter, a determination is made as to whether there are more attributes specified for the filter, INQUIRY 306. If there are no more attributes, then the path is complete. If, however, there are more attributes, then another attribute is selected, STEP 300. The process then repeats for the attribute of the child node. This continues as a recursive descent down the tree until all of the attributes are inserted into the tree. At the leaf node, the unique identifier assigned at registration time to the filter/action pair is stored, for example, in list 218.

Returning to FIG. 1, producer 130 provides an event to matching engine 100 through an event interpreter 102. Events have the same structure and organization as filters. That is, events also include one or more attributes. However, event attributes include concrete values. For example, if a filter has two attributes, including stock issue and stock price, then an event will also have two attributes, including stock issue and stock price. However, the event attributes will have concrete values, such as IBM for stock issue and $100 for stock price. It will not include don't care values (in this embodiment).

The event interpreter transforms the event into a form suitable for use by a search module 104. This includes, for example, converting some attributes that are more complicated than equalities to a format conforming to the format derived by the filter interpreter. For example, if a filter attribute included a range, and therefore the filter interpreter converted the range into a form suitable for the search data structure, then the event interpreter would convert the event into the same form. One example of how this is accomplished is described above. Such conversion of events can be performed before searching or on demand as each test is performed.

Search module 104 searches search data structure 103 to find all filters that match the event. In particular, the search module determines which consumers specified the filters that match the events by traversing the search data structure. As described above, the consumer's identity is stored in matched filter list 218 (FIG. 2b).

The identifier of each filter that matches the event is then used to invoke result unit 110 (FIG. 1). The result unit takes the actions previously registered by each consumer whose filter was matched. For example, the event may be delivered to each matching consumer via any known delivery protocol.

Search Data Structure

In accordance with the principles of the present invention, in order to perform matching, filters, provided by consumers, are first sorted and organized into a search data structure, such as, for instance, a tree structure. Later analysis may transform the structure into a directed, acyclic graph rather than a tree. The search graph has a distinguished node designated as the root of the graph. Matching is performed by following one or more paths from the root of the graph to the leaves of the graph.

Filter interpreter 101 assigns an order to the attributes of each filter. The order is arbitrary, although, all other things being equal, performance is best if the earliest attributes $p_j$ (those closest to the root in search graph 103) are those with the fewest $P_{ij}=*$. Filter interpreter 101 constructs a path of length K in search graph 103 representing the filter's attributes in the given attribute order. On this path, the filter interpreter labels each path segment with a single equality test $p_{ij}$. These labels are stored, in segment table 210 (FIG. 2b) or * segment 212, as appropriate. The paths having a common prefix are merged, resulting in a tree of depth K. For example, in FIG. 2a, path (IBM, 100, 200), path (IBM, 100, 250), path (IBM, 200, 300), and path (IBM, 300, 350) have a common prefix (IBM) and therefore, share that portion of the path.

Figure 4:
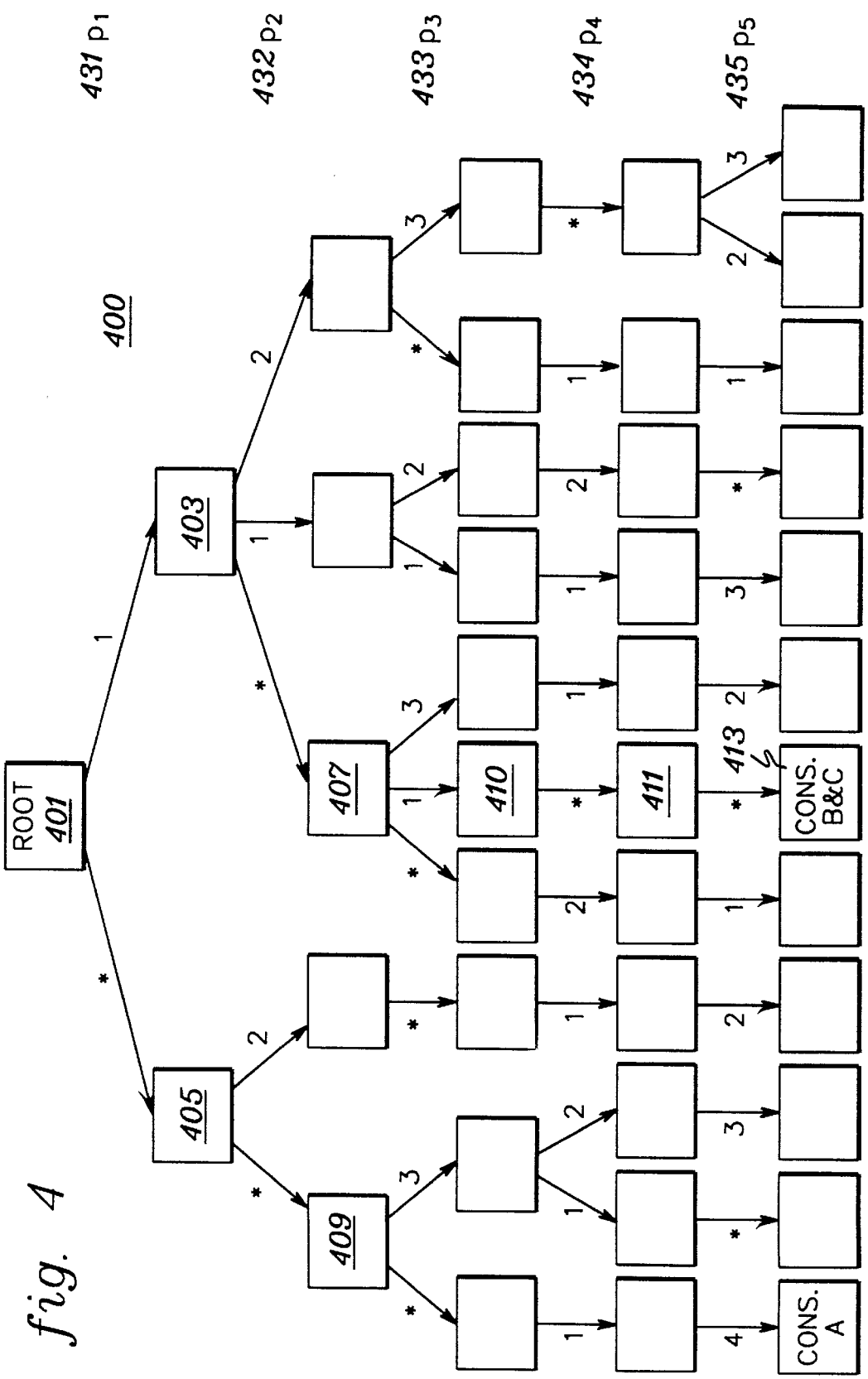
FIG. 4 depicts one example of a search graph built and used in accordance with the principles of the present invention.

One example of a search graph 400 for a sample set of filters is shown in FIG. 4. At matching time, one begins at root 401, with current attribute $p_1$ 431. At any non-leaf node in the graph, one examines the event to find the value $v_j$ of the current attribute $p_j$. One then follows: (1) the segment labeled $v_j$ in the node's segment table 210 (FIG. 2b), if there is such a labeled segment, continuing the search at the daughter node with current attribute $p_{j+1}$, and (2) * segment 212 if there is one, continuing the search at the daughter node with current attribute $p_{j+1}$. This may lead to either 0, 1, or 2 subsearches (more in the general case where the tests are not all strict equalities). When a subsearch reaches a leaf, all filters at that leaf are matched. The filters matched by a leaf are stored in matched filter list 218.

An example of the above is as follows:

Assume an event having the following event attribute values is provided by producer 130: 1, 4, 1, 1, 4. There are five values, since the sample graph of FIG. 4 has five levels representing five filter attributes. Each path segment is labelled with a filter attribute value.

Starting at root 401, select the first event attribute value, 1, and check the information stored in segment table 210 and * segment 212. In this case, there is a segment labelled 1, so that segment is followed in the graph to node 403. Additionally * segment 212 indicates a don't care value, and thus, that segment is also followed to node 405. The process is then repeated at nodes 403 and 405.

For example, the second event attribute value, 4, is selected and the information stored at node 403 is checked. Here, no label 4 is found in the segment table, but a * segment is found, so the * segment is followed to node 407. Additionally, the second event attribute is checked at node 405. Again the * segment is followed to node 409. This process is repeated at each level until one or more leaves is reached or no match is found. The leaves indicate which consumers are interested in this event. In this example, the paths lead to Consumer A and Consumers B and C.

*-Chain Augmented Search Graph

In one embodiment, a certain amount of static analysis of the search graph can be used to streamline the search for matching consumers to events. For example, if a string of search graph nodes is connected by a set of segments all labeled *, with no other branches, this fact can be detected at analysis time (e.g., whenever a filter is added or after a predetermined number of filters are added), and the search at match time can be short-circuited to jump directly to the next test with some non-* branch. For all such sets of * segments, known as a *-chain, a jump count 214 (FIG. 2b) is kept in the node starting the chain and the path to the daughter node is stored in * segment 212.

Figure 5:
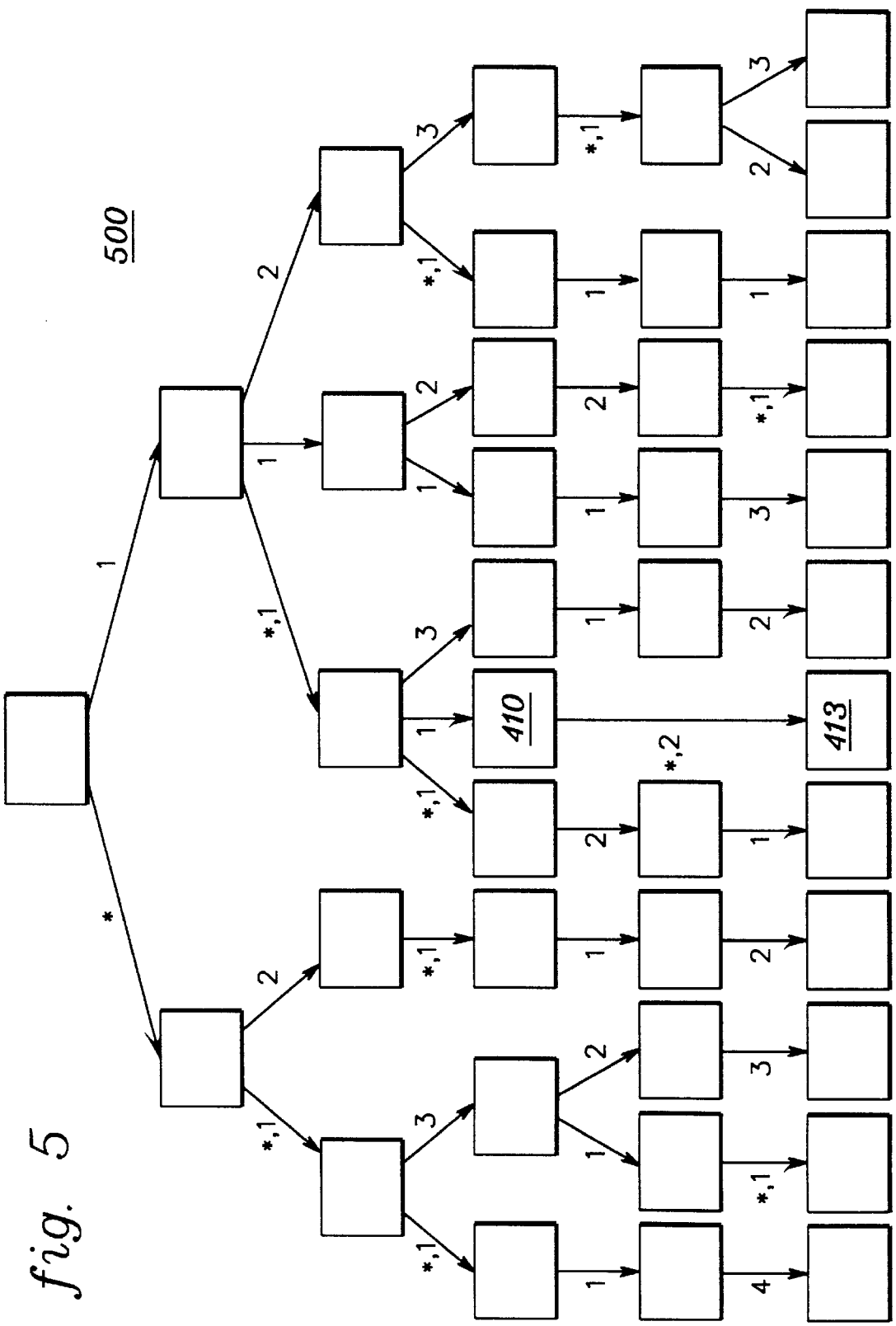
FIG. 5 depicts one example of an augmented search graph built and used in accordance with the principles of the present invention.

For example, with reference to FIG. 4, it can be seen that nodes 411 and 413 satisfy the criteria of a string of nodes connected by a set of * segments, with no other branches, thus these nodes can be combined. This is shown in the sample search graph depicted in FIG. 5. The jump in graph 500 from node 410 to 413 is stored as a *-chain with a length of two (e.g., *,2). The intermediary node (e.g., node 411) is ignored and need not be kept in the graph. This optimization is called *-chain augmentation.

Successor Node Augmented Search Graph

Figure 6:
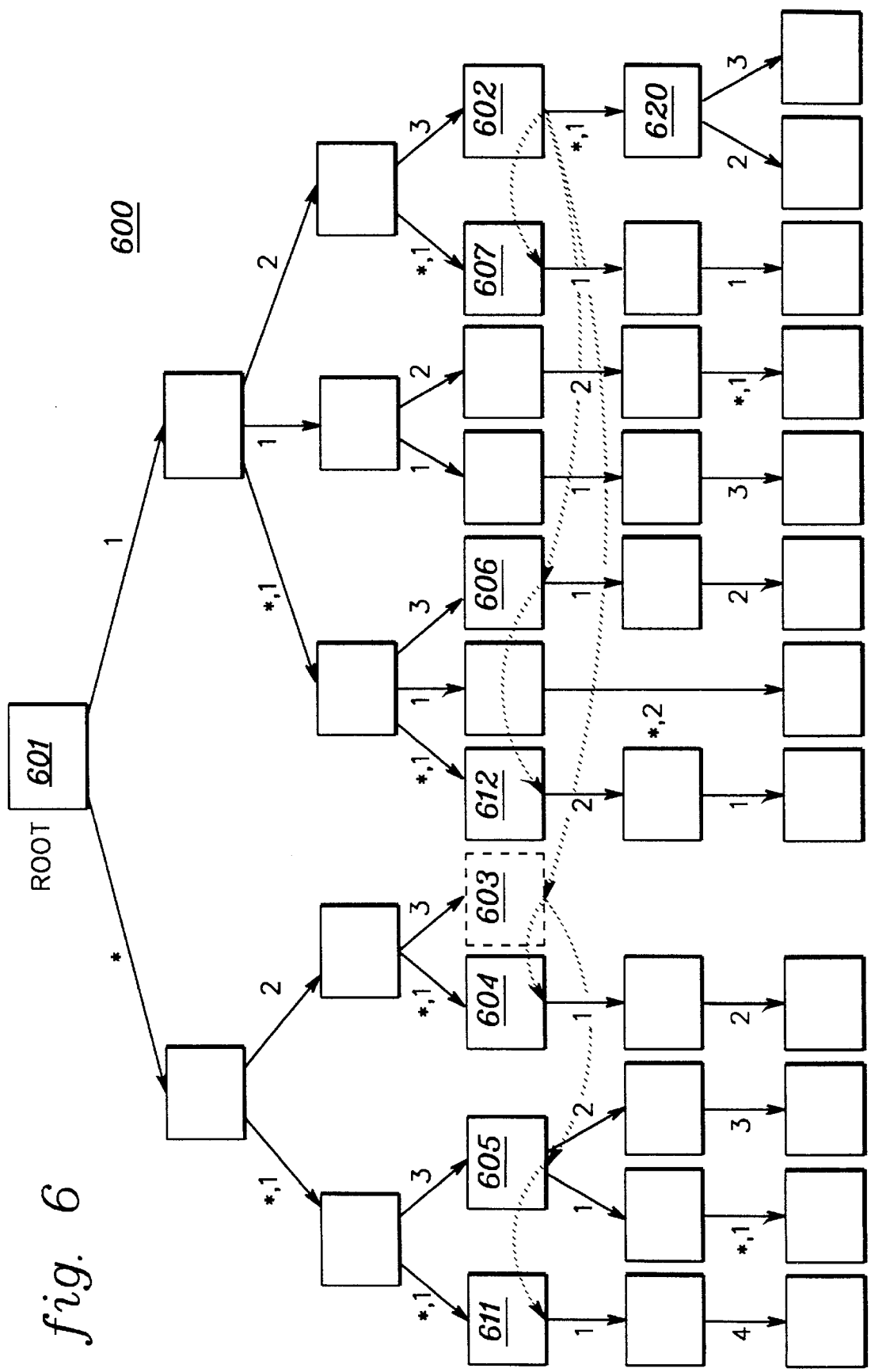
FIG. 6 depicts another example of an augmented search graph built and used in accordance with the principles of the present invention.

In a further embodiment, another optimization can be performed that allows some successor nodes to be precomputed at analysis time, thereby reducing the number of attribute re-evaluations needed at matching time. For example, consider the sample search graph of FIG. 6. Also consider an event in which the first four attributes $<v_1=1, v_2=2, v_3=3, v_4=8>$ are to be matched. Ignoring *-branches, the path $<v_1=1, v_2=2, V_3=3>$ is followed from root 601 to node 602. At node 602, the path is blocked, since there is no path having the label $v_4=8$. However, static analysis can predict that, in the above example, the nodes with paths labeled $<p_1=*, p_2=2, p_3=3>$; $<p_1=1, p_2=*, p_3=3>$; and $<p_1=1, p_2=2, p_3=*>$ will be searched whenever node 602 is reached, if they exist, since those paths satisfy the first three event attributes. These nodes are referred to as successor nodes. Static analysis computes the successors in advance, and stores pointers to them in successor node set 216 (FIG. 2b) of node 602. In this case, the successor node set for node 602 includes nodes 604, 605, 606, and 607. In turn, node 605 has the successor node set containing node 611; and node 606 has the successor node set 612. This optimization is called successor node augmentation.

Formally, the rule for computing successor nodes is as follows: if the path p to a node N ends in n consecutive non-* segments, the successor set SS(p) corresponding to that path consists of the n paths $p_i$ obtained by replacing one of the non-* segments with a *. The successor node set saved in the node at p contains, for each $p_i$ in SS(p), a pointer to the node at $p_i$ if it exists, else the nodes in the successor node set of the node at $p_i$. If there is a daughter node reachable by a segment labeled *, this node is also appended to the successor node set.

One example of how a successor node set for node 602 is computed is as follows:

The path to node 602 is labelled 1, 2, 3 corresponding to values for three filter attributes, $p_1$, $p_2$, $p_3$, respectively. The value of $p_3$ is replaced by a * (don't care value) producing a path of 1,2,*. This path is followed in the graph leading to node 607, thus 607 is part of node 602's successor set. Next, the value of $p_2$ is replaced by a * ($p_3$ is restored to its original value), yielding a path of 1,*,3. This path leads to node 606, which is added to the successor set. Next, the value of $p_1$ is replaced by a * ($p_2$ is restored to is original value) yielding a path of *,2,3. This path leads to a non-existent node, node 603.

Thus, the successor nodes for node 603 are determined, as follows.

Virtual node 603 has a path labelled *,2,3, thus only two new paths are created: *,2,* and *,*,3, since * values are not replaced. The path *,2,* yields node 604 and *,*,3 yields node 605. Thus, nodes 604 and 605 are added to successor node set 216 of node 602.

Furthermore, node 620 is included in the successor node set, since it is the child node of 602 reachable by a segment labelled *. The successor node set for node 602 is now complete and includes nodes 604, 605, 606, 607 and 620.

The above process can be repeated for each node (or a subset of the nodes) in the graph.

During matching, only non-* branches are followed until a node is reached for which there is no daughter node labeled with the value of the tested attribute, or until a leaf is reached. Then the successor node set is used to determine where to continue the search. At each leaf, the subscriptions at that leaf and at its successors are matched. Thus, using the above example and an event having values of 1, 2, 3, 8, at matching time, the path 1, 2, 3 is followed to node 602 and then, the successor set at node 602 indicates at which nodes the search is to continue. This eliminates retesting the path segments corresponding to the first three attributes of the event.

In addition to the above, an alternative embodiment could utilize an even more radical space-time tradeoff involving a one-attribute lookahead: that is, storing a separate list of successor pointers for each possible unmatched value of the tested attribute.

Factoring

Another space-time tradeoff involves factoring the matching problem into subproblems, based on the combination of values of the most popular attributes. If there are V possible values and $K_p$ popular attributes, then there will be $V_{K_p}$ subproblems.

For example, consider the sample graph depicted in FIG. 4. Also, consider that $K_p=1$, and it is determined that attribute 4 (i.e., $p_4$) is the most "popular" attribute (least likely to be the don't care value,*). The twelve subscriptions (i.e., paths leading to the leaves of the graph) in that figure are partitioned into two groups—one for each of the two possible concrete values of the attribute $p_4$. If test $p_4$ in a subscription has the value 1, the subscription is assigned to Group 1; if test $p_4$ has the value 2, the subscription is assigned to Group 2; and if test $p_4$ has the value *, it is assigned to both groups. Thus, in the above example, Group 1 includes *,*,*,1,4; *,*,3,1,*; *,2,*,1,2; 1,*,1,*,*; 1,*,3,1,2; 1,1,1,3; 1,2,*,1,1,; 1,2,3,*,2; and 1,2,3,*,3. Further, Group 2 includes *,*,3,2,3; 1,*,*,2,1; 1,*,1,*,*; 1,1,2,2,*; 1,2,3,*,2; and 1,2,3,*,3.

Figure 8A:
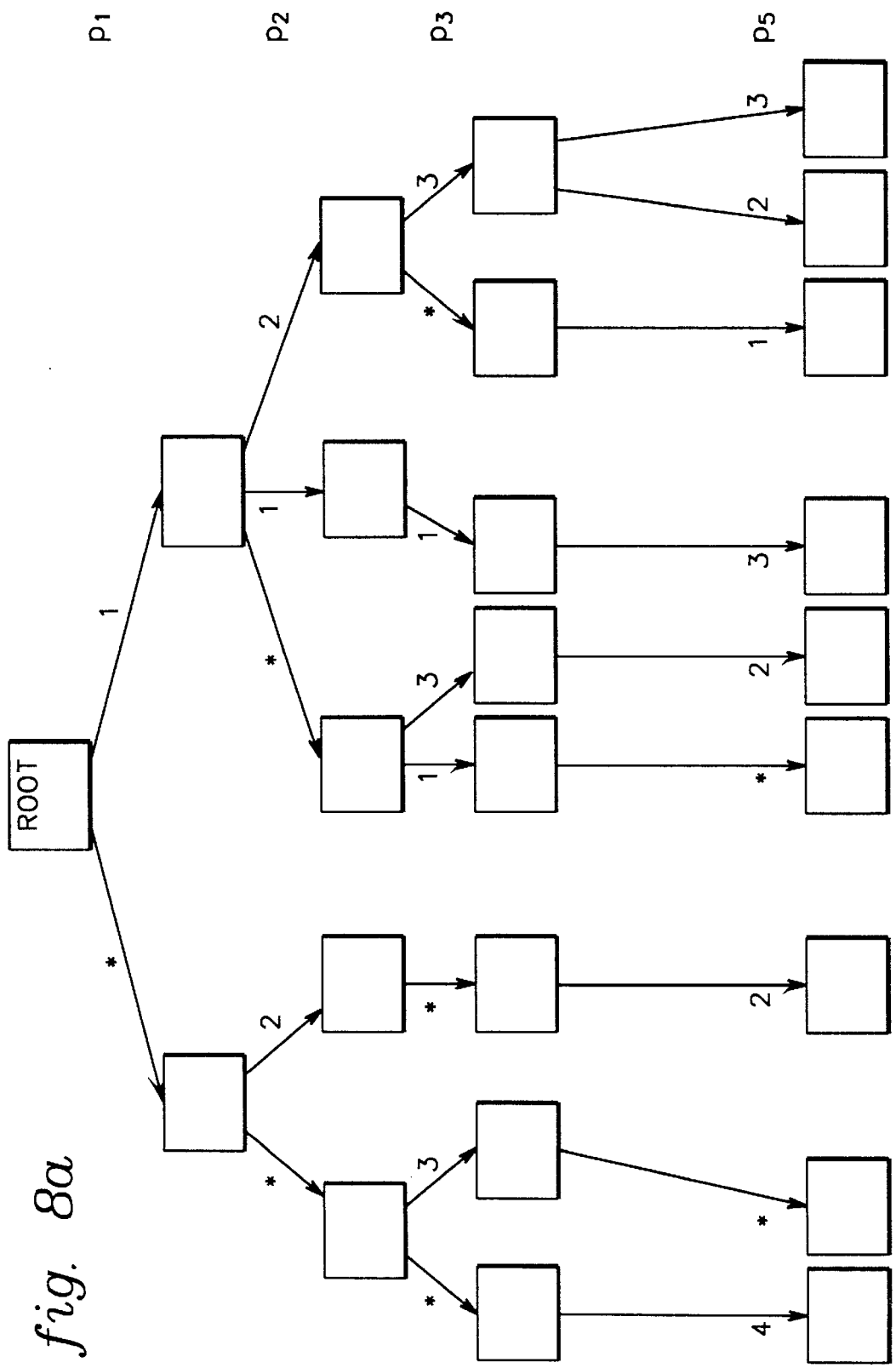
FIGS. 8a–8b depict examples of sub-search data structures built and used in accordance with the principles of the present invention.
Figure 8B:
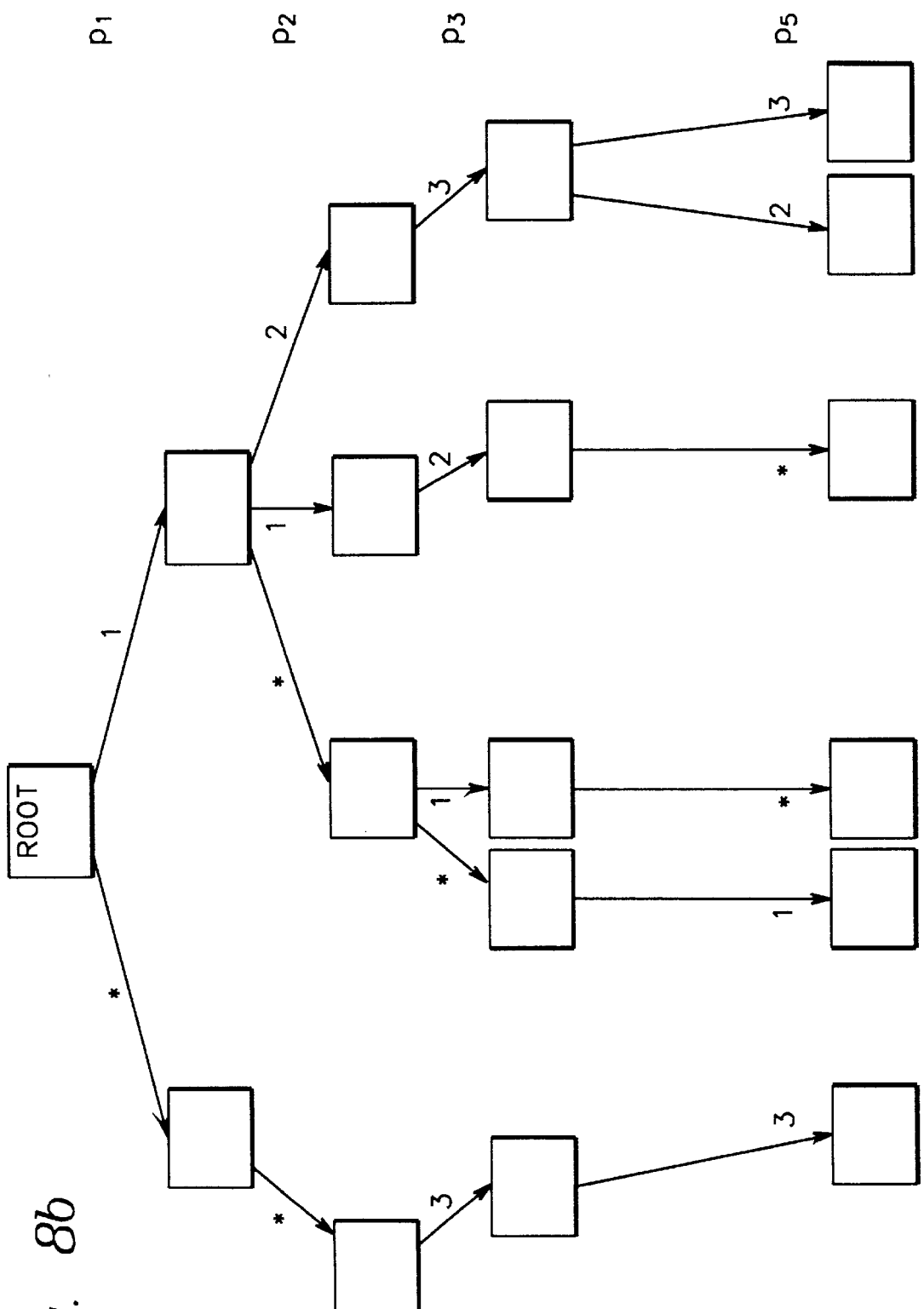

For each group, a sub-search data structure (e.g., a sub-search tree or graph) is built in the manner discussed above. However, in building the sub-search data structures, the selected popular attribute is left out. (The plurality of sub-search data structures is referred to herein as a search data structure.) One example of a sub-search graph for Group 1 is depicted in FIG. 8a and for Group 2 is depicted in FIG. 8b.

When an event comes in, the attribute of $p_4$ is examined to determine which sub-search graph to traverse. For instance, if the event is 1,1,1,1,3, then, since $p_4=1$, the sub-search graph corresponding to Group 1 (FIG. 8a) is searched. During the search, p4 is left out. Thus, 1,1,1,3 is used to search the data structure.

The above example of one popular attribute is only one example. Any number of popular attributes may be chosen. The number of sub-search graphs built depends on the number of popular attributes and the possible values for those attributes. For instance, if two popular attributes were chosen having two concrete values (e.g., 1 and 2), then four graphs would be built—one for each of the combinations:

| $p_3$ | $p_4$ | |
|---|---|---|
| 1 | 1 | graph 1 |
| 1 | 2 | graph 2 |
| 2 | 1 | graph 3 |
| 2 | 2 | graph 4. |

The above-described optimization does not scale well to large numbers of popular attributes. However, for small $K_p$, the space investment is manageable, and the time saved is significant. The step of using the most popular $K_p$ values to select a subproblem can be applied in conjunction with any of the techniques discussed above.

Described above are a number of optimizations that may be applied to a search data structure. One or more of the optimizations may be applied to the same structure.

Content-Based Subscription

In accordance with the principles of the present invention, a publish/subscribe system is constructed that does not rely on a prepartitioning of data into groups. Such a publish/subscribe system utilizes content-based subscription. Content-based subscription is the ability of subscribers to specify interest in events based on operations limited only by the structure of the events and the operations supported by the pattern language.

Consider a stock market example where events for executed trades include the name of the security, the price, and the volume of shares being traded. Previously, to structure the stock market example using groups a group is assigned for every security and events are published to the group associated with the appropriate security. A user wishing to view this information along a different dimension is left without adequate support. For example, consider a trader who is interested in high volume transactions, e.g., those involving over 100,000 shares. In a group-based publish/subscribe system, such a subscriber is forced to subscribe to all groups and filter out itself all events except the few the subscriber needs.

With the content-based subscription of the present invention, one subscriber may specify interest in all events associated with a security, another may restrict itself to trades associated with a security, and a third subscriber may express interest in all trades over 100,000 shares regardless of security. While groups restrict subscriptions to a single dimension (i.e., the groups name), the technique of the present invention deals with multiple dimensions (in this example, security name, price, and number of shares).

Figure 7:
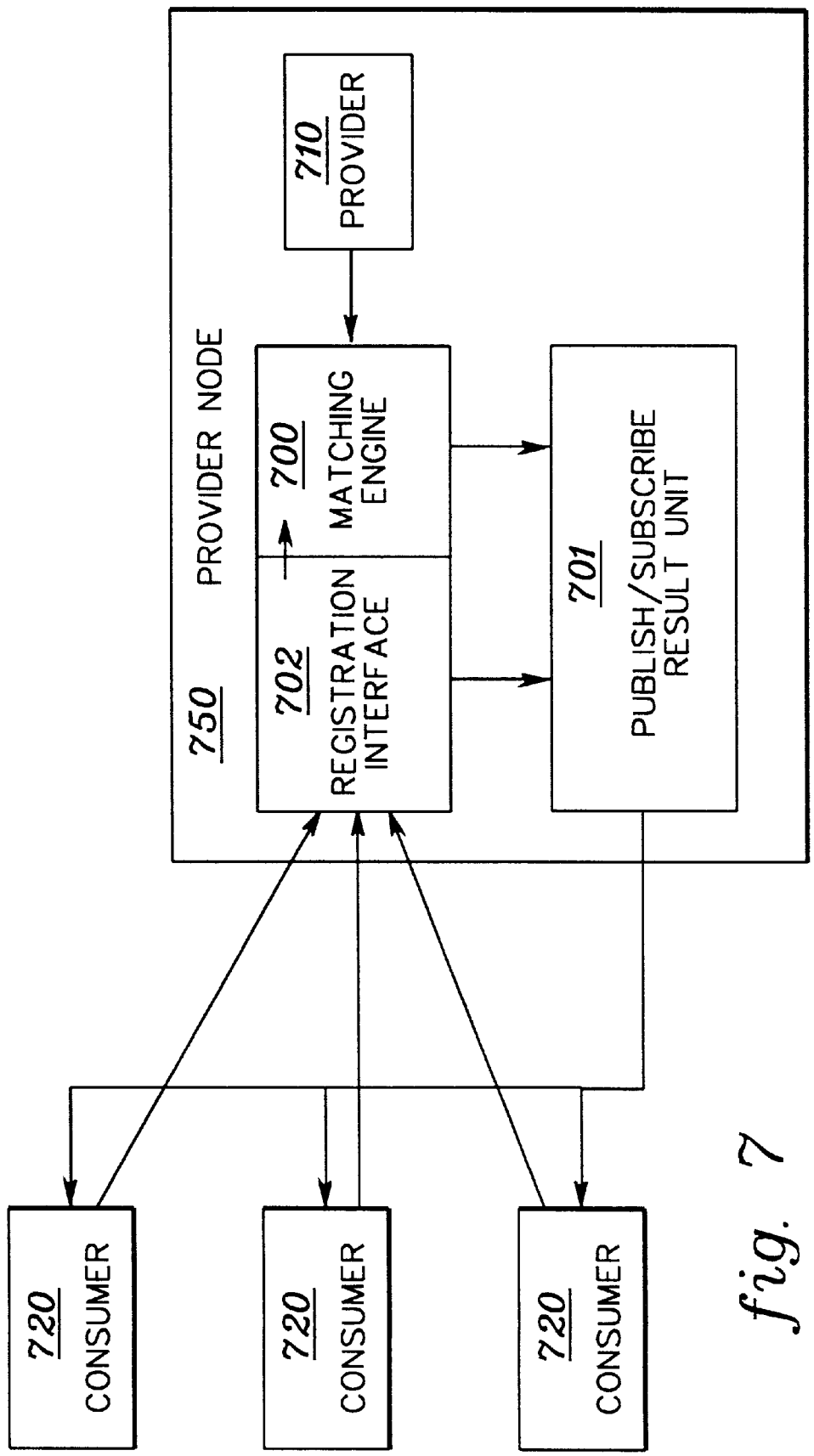
FIG. 7 depicts one example of a publish/subscribe system incorporating and using the matching capability of the present invention.

FIG. 7 shows one example of a publish/subscribe system incorporating and using the content-based subscription of the present invention. Each provider 710 is coupled to a matching engine 700 on a provider node 750. Further, each consumer 720 (e.g., a subscriber) is coupled to registration interface 702. The matching engine and registration interface are, for example, similar to matching engine 100 and registration interface 105 in the system shown in FIG. 1. The publish/subscribe result unit is a special case of result unit 110 in the system shown in FIG. 1. The publish/subscribe result unit is provided with the identity of each consumer 720 registering a subscription. This identity includes enough information for the publish/subscribe result unit to communicate with the consumer through the distributed network. For each filter matched by matching engine 700 in response to an event from provider 710, the publish/subscribe result unit delivers the event to the subscribers registering the filter. Distribution of the event is through the distributed network and may be in a point-to-point manner (publish/subscribe result unit 701 communicates with each consumer 720 with a matching filter) or through a typical multicast, or broadcast mechanism. The distributed mechanism is dependent on the capabilities of the distributed network.

To one skilled in the art, several variations on this system are readily apparent. Although each provider resides on autonomous nodes connected through a distributed network to other providers and consumers in the above embodiment, in other embodiments some or all of the providers and consumers may be coupled on the same node. In addition, a plurality of providers may share a common matching engine and result unit. In fact, all providers may share a single matching engine and result unit. In one example, provider node 750 is an RS/6000 computing node, as well as each consumer 720. However, various other computing units, computing nodes, processors, computers or systems may be used without departing from the spirit of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the invention can be provided.

The flow diagram depicted herein is just one example. There may be many variations to this diagram or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of determining zero or more consumers interested in an event, said method comprising:
   receiving an event; and
   using a search data structure to determine zero or more consumers interested in said event, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure.

2. The method of claim 1, wherein at least one of the attributes having said don't care value further has a second value, and wherein traversal of a second path also proceeds upon successful testing of the second value, wherein said second path comprises said another path.

3. The method of claim 1, wherein said using comprises traversing said search data structure from a root of said search data structure to zero or more leaves of said search data structure, said zero or more leaves indicating said zero or more consumers interested in said event.

4. The method of claim 3, wherein said event comprises one or more event attribute values and wherein said traversing comprises using said one or more event attribute values to reach said zero or more leaves.

5. The method of claim 1, further comprising building said search data structure.

6. The method of claim 5, wherein said building comprises:
   specifying, by a consumer, a filter having one or more attribute values, said one or more attribute values corresponding to said one or more attributes; and
   inserting said one or more attribute values into said search data structure.

7. The method of claim 6, wherein said inserting comprises storing said one or more attribute values in at least one node of said search data structure.

8. The method of claim 6, wherein said building further comprises indicating within said search data structure said consumer specifying said filter.

9. The method of claim 6, further comprising inserting into said search data structure one or more other attribute values specified by one or more other filters provided by one or more consumers, wherein a plurality of paths is created and wherein paths having a common prefix are merged.

10. The method of claim 9, wherein said event comprises one or more event attribute values, and wherein said using comprises traversing one or more paths of said search data structure using said event attribute values.

11. The method of claim 5, wherein said building comprises transforming said search data structure.

12. The method of claim 11, wherein a plurality of consecutive attributes in said path have a don't care value, and wherein said transforming comprises combining levels within said path corresponding to said plurality of consecutive attributes having said don't care values.

13. The method of claim 12, wherein said plurality of consecutive attributes in said path only have said don't care value.

14. The method of claim 1, wherein said search data structure comprises a plurality of paths, and wherein said method further comprises computing a successor set for a node of said search data structure, said successor set defining how to traverse said search data structure after reaching said node.

15. The method of claim 14, wherein said computing comprises:
   determining one or more subpaths associated with said node; and
   identifying one or more successor nodes reached by traversing said one or more subpaths, said one or more successor nodes comprising said successor set.

16. The method of claim 15, wherein a path to said node is represented by one or more attribute values, at least one of said one or more attribute values having a concrete value, and wherein said determining comprises:

replacing one concrete attribute value with a don't care value, wherein a subpath is created; and repeating said replacing for any other attribute values having a concrete value, wherein only one attribute value is replaced at any given time.

17. The method of claim 16, wherein if a subpath is created that has a non-existent node, one or more successor nodes of said non-existent node is identified in said successor set, instead of said non-existent node.

18. The method of claim 1, wherein said search data structure comprises a plurality of sub-search data structures.

19. The method of claim 18, wherein said using comprises:

selecting one of said sub-search data structures; and traversing said selected sub-search data structure to determine said zero or more consumers.

20. The method of claim 19, wherein said event comprises a plurality of event attributes, and wherein said selecting comprises using one or more values of one or more chosen attributes of said plurality of event attributes to select said subsearch data structure to be traversed.

21. The method of claim 5, wherein said building further comprises ordering said one or more attributes based upon its relative likelihood of having a concrete value in one or more filters, wherein those attributes most likely to have concrete values are tested earlier than those less likely to have concrete values.

22. The method of claim 1, wherein said zero or more consumers are subscribers of a publish/subscribe system and said receiving comprises receiving, from a publisher of said publish/subscribe system, said event.

23. A method of publishing an event in a publish/subscribe system, said method comprising:

providing, by a publisher of said publish/subscribe system, an event to be published to one or more subscribers of said publish/subscribe system, said event being independent of a group association and lacking a group identifier;

determining said one or more subscribers interested in said event, said determining comprising using a search data structure to determine said one or more subscribers, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure; and publishing said event to one or more subscribers indicating interest in said event.

24. The method of claim 23, further comprising providing, by said one or more subscribers, one or more filters indicating interest in said event.

25. The method of claim 24, wherein at least one filter of said one or more filters includes a plurality of attributes to be used in indicating interest in said event.

26. The method of claim 24, wherein said one or more filters is located in said publish/subscribe system independent of said one or more subscribers.

27. The method of claim 23, wherein said using comprises traversing said search data structure from a root of said search data structure to one or more leaves of said search data structure, said one or more leaves indicating said one or more subscribers interested in said event.

28. The method of claim 27, wherein said event comprises one or more event attribute values and wherein said traversing comprises using said one or more event attribute values to reach said one or more leaves.

29. The method of claim 23, further comprising building said search data structure.

30. The method of claim 23, further comprising optimizing said search data structure.

31. At least one program storage device readable by a machine, tangibly embodying at least one program of instructions executable by the machine to perform a method of determining zero or more consumers interested in an event, said method comprising:

receiving an event; and using a search data structure to determine zero or more consumers interested in said event, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure.

32. The at least one program storage device of claim 31, wherein at least one of the attributes having said don't care value further has a second value, and wherein traversal of a second path also proceeds upon successful testing of the second value, wherein said second path comprises said another path.

33. The at least one program storage device of claim 31, wherein said using comprises traversing said search data structure from a root of said search data structure to zero or more leaves of said search data structure, said zero or more leaves indicating said zero or more consumers interested in said event.

34. The at least one program storage device of claim 33, wherein said event comprises one or more event attribute values and wherein said traversing comprises using said one or more event attribute values to reach said zero or more leaves.

35. The at least one program storage device of claim 31, wherein said method further comprises building said search data structure.

36. The at least one program storage device of claim 35, wherein said building comprises:

specifying, by a consumer, a filter having one or more attribute values, said one or more attribute values corresponding to said one or more attributes; and inserting said one or more attribute values into said search data structure.

37. The at least one program storage device of claim 36, wherein said inserting comprises storing said one or more attribute values in at least one node of said search data structure.

38. The at least one program storage device of claim 36, wherein said building further comprises indicating within said search data structure said consumer specifying said filter.

39. The at least one program storage device of claim 36, wherein said method further comprises inserting into said search data structure one or more other attribute values specified by one or more other filters provided by one or more consumers, wherein a plurality of paths is created and wherein paths having a common prefix are merged.

40. The at least one program storage device of claim 39, wherein said event comprises one or more event attribute values, and wherein said using comprises traversing one or more paths of said search data structure using said event attribute values.

41. The at least one program storage device of claim 39, wherein said building comprises transforming said search data structure.

42. The at least one program storage device of claim 41, wherein a plurality of consecutive attributes in said path have a don't care value, and wherein said transforming comprises combining levels within said path corresponding to said plurality of consecutive attributes having said don't care values.

43. The at least one program storage device of claim 42, wherein said plurality of consecutive attributes in said path only have said don't care value.

44. The at least one program storage device of claim 31, wherein said search data structure comprises a plurality of paths, and wherein said method further comprises computing a successor set for a node of said search data structure, said successor set defining how to traverse said search data structure after reaching said node.

45. The at least one program storage device of claim 44, wherein said computing comprises:
    determining one or more subpaths associated with said node; and
    identifying one or more successor nodes reached by traversing said one or more subpaths, said one or more successor nodes comprising said successor set.

46. The at least one program storage device of claim 45, wherein a path to said node is represented by one or more attribute values, at least one of said one or more attribute values having a concrete value, and wherein said determining comprises:
    replacing one concrete attribute value with a don't care value, wherein a subpath is created; and
    repeating said replacing for any other attribute values having a concrete value, wherein only one attribute value is replaced at any given time.

47. The at least one program storage device of claim 46, wherein if a subpath is created that has a non-existent node, one or more successor nodes of said non-existent node is identified in said successor set, instead of said non-existent node.

48. The at least one program storage device of claim 31, wherein said search data structure comprises a plurality of sub-search data structures.

49. The at least one program storage device of claim 48, wherein said using comprises:
    selecting one of said sub-search data structures; and
    traversing said selected sub-search data structure to determine said zero or more consumers.

50. The at least one program storage device of claim 49, wherein said event comprises a plurality of event attributes, and wherein said selecting comprises using one or more values of one or more chosen attributes of said plurality of event attributes to select said sub-search data structure to be traversed.

51. The at least one program storage device of claim 35, wherein said building further comprises ordering said one or more attributes based upon its relative likelihood of having a concrete value in one or more filters, wherein those attributes most likely to have concrete values are tested earlier than those less likely to have concrete values.

52. At least one program storage device readable by a machine, tangibly embodying at least one program of instructions executable by the machine to perform a method of publishing an event in a publish/subscribe system, said method comprising:
    providing, by a publisher of said publish/subscribe system, an event to be published to one or more subscribers of said publish/subscribe system, said event being independent of a group association and lacking a group identifier;
    determining said one or more subscribers interested in said event, said determining comprising using a search data structure to determine said one or more subscribers, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure; and
    publishing said event to one or more subscribers indicating interest in said event.

53. The at least one program storage device of claim 52, wherein said method further comprises providing, by said one or more subscribers, one or more filters indicating interest in said event.

54. The at least one program storage device of claim 53, wherein at least one filter of said one or more filters includes a plurality of attributes to be used in indicating interest in said event.

55. The at least one program storage device of claim 53, wherein said one or more filters is located in said publish/subscribe system independent of said one or more subscribers.

56. The at least one program storage device of claim 52, wherein said using comprises traversing said search data structure from a root of said search data structure to one or more leaves of said search data structure, said one or more leaves indicating said one or more subscribers interested in said event.

57. The at least one program storage device of claim 56, wherein said event comprises one or more event attribute values and wherein said traversing comprises using said one or more event attribute values to reach said one or more leaves.

58. The at least one program storage device of claim 52, wherein said method further comprises building said search data structure.

59. The at least one program storage device of claim 52, wherein said method further comprises optimizing said search data structure.

60. An article of manufacture, comprising:
    at least one computer usable medium having computer readable program code means embodied therein for causing the determining of zero or more consumers interested in an event, the computer readable program code means in said article of manufacture comprising:
    computer readable program code means for causing a computer to receive an event; and
    computer readable program code means for causing a computer to use a search data structure to determine zero or more consumers interested in said event, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure.

61. The article of manufacture of claim 60, wherein at least one of the attributes having said don't care value further has a second value, and wherein traversal of a second path also proceeds upon successful testing of the second value, wherein said second path comprises said another path.

62. The article of manufacture of claim 60, wherein said computer readable program code means for causing a computer to use comprises computer readable program code means for causing a computer to traverse said search data structure from a root of said search data structure to zero or more leaves of said search data structure, said zero or more leaves indicating said zero or more consumers interested in said event.

63. The article of manufacture of claim 60, further comprising computer readable program code means for causing a computer to build said search data structure.

64. The article of manufacture of claim 63, wherein said computer readable program code means for causing a computer to build comprises computer readable program code means for causing a computer to transform said search data structure.

65. The article of manufacture of claim 62, wherein a plurality of consecutive attributes in said path have a don't care value, and wherein said computer readable program code means for causing a computer to transform comprises computer readable program code means for causing a computer to combine levels within said path corresponding to said plurality of consecutive attributes having said don't care values.

66. The article of manufacture of claim 60, wherein said search data structure comprises a plurality of paths and wherein said article of manufacture further comprises computer readable program code means for causing a computer to compute a successor set for a node of said search data structure, said successor set defining how to traverse said search data structure after reaching said node.

67. The article of manufacture of claim 60, wherein said search data structure comprises a plurality of sub-search data structures.

68. An article of manufacture, comprising:
at least one computer usable medium having computer readable program code means embodied therein for causing the publishing of an event in a publish/subscribe system, the computer readable program code means in said article of manufacture comprising:
computer readable program code means for causing a computer to provide an event to be published to one or more subscribers of said publish/subscribe system, said event being independent of a group association and lacking a group identifier;
computer readable program code means for causing a computer to determine said one or more subscribers interested in said event, said determining comprising using a search data structure to determine said one or more subscribers, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure; and
computer readable program code means for causing a computer to publish said event to one or more subscribers indicating interest in said event.

69. The article of manufacture of claim 68, further comprising computer readable program code means for causing a computer to build said search data structure.

70. The article of manufacture of claim 68, further comprising computer readable program code means for causing a computer to optimize said search data structure.

71. A system of determining zero or more consumers interested in an event, said system comprising:
means for receiving an event; and
a search data structure usable in determining zero or more consumers interested in said event, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure.

72. A system of publishing an event in a publish/subscribe system, said system comprising:
a publisher of said publish/subscribe system adapted to provide an event to be published to one or more subscribers of said publish/subscribe system, said event being independent of a group association and lacking a group identifier;
means for determining said one or more subscribers interested in said event, said means for determining comprising a search data structure useable in determining said one or more subscribers, said search data structure comprising a path having one or more levels, said one or more levels corresponding to one or more attributes, and wherein a value of at least one attribute is a don't care value meaning traversal of the path is guaranteed to proceed irrespective of whether another path is also followed, wherein when said another path is also followed said search data structure comprises a spatially parallel search structure; and
means for publishing said event to one or more subscribers indicating interest in said event.

\* \* \* \* \*